United States Patent [19]

Leonard, Jr. et al.

[11] 4,244,747
[45] Jan. 13, 1981

[54] MODIFIED ASPHALT PAVING COMPOSITIONS

[75] Inventors: John B. Leonard, Jr., Hillsborough; Philip T. Selfridge, Sunnyvale, both of Calif.

[73] Assignee: Chem-Crete Corporation, Menlo Park, Calif.

[21] Appl. No.: 19,739

[22] Filed: Mar. 12, 1979

[51] Int. Cl.³ .......................... E01C 7/18; E01C 7/22; E01C 7/26
[52] U.S. Cl. .............................. 106/271; 106/273 R; 106/287 R; 427/138
[58] Field of Search ............... 106/273 R, 277, 281 R; 427/138

[56] References Cited

U.S. PATENT DOCUMENTS

| | | | |
|---|---|---|---|
| 1,328,310 | 1/1920 | Willis | 106/280 |
| 1,505,880 | 8/1924 | Fairlie | 106/31 |
| 2,013,972 | 9/1935 | Sadtler | 106/31 |
| 2,023,068 | 12/1935 | Flood | 106/31 |
| 2,110,072 | 3/1938 | Alvarado | 134/26 |
| 2,243,409 | 5/1941 | Baldeachwieler | 106/31 |
| 2,276,436 | 3/1942 | Tucker et al. | 106/273 R |
| 2,296,712 | 9/1942 | Grant et al. | 154/50 |
| 2,312,674 | 3/1943 | Roediger | 106/269 |
| 2,313,759 | 3/1943 | McCoy | 106/273 R |
| 2,339,853 | 1/1944 | Hemmer | 106/269 |
| 2,342,861 | 2/1944 | Hemmer | 106/269 |
| 2,391,750 | 12/1945 | Snyder | 106/15 |
| 2,416,134 | 2/1947 | Allen | 106/269 |
| 2,430,546 | 11/1947 | Agnew | 106/269 |
| 2,752,264 | 6/1956 | Pickell | 106/248 |
| 2,773,777 | 12/1956 | Alexander et al. | 106/277 |
| 2,774,724 | 12/1956 | Watson | 106/142 |
| 2,928,753 | 3/1960 | Schmitt | 106/269 |
| 2,941,894 | 6/1960 | McAdow | 106/193 |
| 3,095,314 | 6/1963 | Munday et al. | 106/273 R |
| 3,243,311 | 3/1966 | Rogers | 106/280 |
| 3,455,716 | 7/1969 | Loring et al. | 106/268 |
| 3,868,263 | 2/1975 | McConnaughay | 106/281 |
| 4,008,095 | 2/1977 | Fukushima | 106/235 |

FOREIGN PATENT DOCUMENTS

| | | |
|---|---|---|
| 355430 | 8/1931 | United Kingdom . |
| 510912 | 8/1939 | United Kingdom . |
| 510997 | 8/1939 | United Kingdom . |
| 513944 | 10/1939 | United Kingdom . |
| 533927 | 2/1941 | United Kingdom . |
| 605057 | 7/1948 | United Kingdom . |
| 873182 | 7/1961 | United Kingdom . |
| 996274 | 6/1965 | United Kingdom . |

*Primary Examiner*—V. P. Hoke
*Attorney, Agent, or Firm*—Hosier, Niro & Daleiden

[57] ABSTRACT

A modified asphalt cement including manganese chloride ($MnCl_2$) dispersed throughout the asphalt cement. A paving composition including the above material forming a binder for aggregate used for paving roads or the like.

9 Claims, No Drawings

MODIFIED ASPHALT PAVING COMPOSITIONS

CROSS-REFERENCE TO RELATED APPLICATIONS

Reference is made to copending patent application Ser. No. 963,293, filed Nov. 24, 1978, entitled "High Strength Modified Asphalt Paving Composition".

BACKGROUND OF THE INVENTION

The present invention relates to an improved asphalt cement for use with aggregate in a paving composition.

Aggregate-containing asphalt has been employed as the paving composition for roads or the like for many years. The asphalt includes bitumen as a predominant constituent and is conventionally obtained as a solid residue from the distillation of crude petroleum. The asphalt is converted to a fluid state when paving a road. One fluid formed is the suspension or emulsion of the asphalt in water. After spreading and compressing the aggregate-containing asphalt, water evaporates and the asphalt hardens into a continuous mass. Another form of asphalt employed in road construction is a cutback, i.e., a liquid petroleum product produced by fluxing an asphaltic base with a suitable organic solvent or distillate. A road is formed by paving the aggregate-containing cutback and evaporating the volatile distillate from the mass. An advantage of using the above road construction techniques is the avoidance of high temperature application. In an alternative technique, the asphalt and aggregate can be mixed and applied at elevated temperatures at the fluid state of the asphalt to form the road. This form of asphalt, which is neither cut-back nor emulsified is referred to as asphalt cement.

A major problem with cutbacks and emulsions is their low adhesivity for aggregate in comparison to asphalt cement. This is due primarily to (a) the organic solvent or oil in the cutback and/or (b) the water in the emulsion on the aggregate surface which interferes with the formation of an adhesive bond with the aggregate and asphalt. One technique which has been disclosed to increase such adhesivity is set forth in Rogers et al U.S. Pat. No. 3,243,311. There, the aggregate is pretreated wih one of a variety of metal compounds stated to be cross-linking agents for the organic binder to oxidize polymerize or catalyze and thereby harden the binder. The pretreatment is stated to improve adhesivity of the binder and aggregate, specifically for clay-type soil aggregate. The cross-linking agents are stated to be multioxidation state metals in their higher oxidation state. The anions are stated to include a large variety of organic and inorganic acids. In addition, salts such as the halides and a large variety of inorganic oxides are mentioned. The anions are stated to include Group I, Group IV, Group V, Group VII, and Group VIII metals as well as rare earth metals. Specific examples include $Cu(OH)_2$, $CuCl_2$, $FeCl_3$, $CuSO_4$, and $KMnO_4$. In each instance, the soil is pretreated with the cross-linking agent prior to mixing with the asphalt cutback.

In Willis U.S. Pat. No. 1,328,310, an asphaltic pavement is disclosed in which copper sulfate is added to the asphalt for improving physical properties. Other compounds mentioned for this purpose include the sulfates or selenates of aluminum, chromium, iron, indium, galium, and the sulfates or selenides of sodium, potassium, rhubidium, ammonium, silver, gold, platinum or thalium. These compounds are relatively insoluble in the asphalt.

Alexander U.S. Pat. No. 2,773,777 discloses a bituminous composition particularly suitable for airport runways exposed to the high temperatures of the exhaust gases of jet engines. The composition includes bitumen emulsion, Portland cement, and mineral aggregate. To this mixture is added an aqueous solution of one of a number of water soluble salts for the purpose of giving plasticity to the composition. The salts are stated to be water-soluble polyvalent metal salts of a strong mineral acid, especially sulfuric, hydrochloric and/or phosphoric acids. The most effective salts are stated to be alkali earth metal salts including calcium chloride, magnesium chloride, barium chloride and the like. Salts of amphoteric metals are stated to be also useful including aluminum sulfate, chromium chloride and aluminum chloride. Other disclosed salts include antimony chloride, cobalt chloride, ferric chloride, antimony sulfate, cadmium sulfate and magnesium chloride. The specific examples include as salts calcium chloride, aluminum sulfate and magnesium chloride.

SUMMARY OF THE INVENTION AND OBJECTS

In accordance with the present invention, it has been found that by dissolving manganese chloride ($MnCl_2$) in asphalt cement and then mixing it with aggregate, a paving of vastly improved characteristics is formed. In quantities of about 0.02 to about 2 weight % of the asphalt cement, the manganese chloride produces a significant increase in compressive, flexural and fatigue strength of the ultimate cured paved road.

The manganese chloride is added to the asphalt cement while the latter is fluidized by heating to a temperature above its melting or softening point. The manganese chloride-containing asphalt cement may then be mixed in this form directly with the aggregate for road construction or it may be emulsified or cut-back prior to mixing with the aggregate. It has been found that the modified asphalt cement may be stored in bulk prior to road formation without substantial thickening.

It is an object of the invention to provide an asphalt cement modified with a relatively inexpensive agent which cement is suitable for mixing with aggregate to form a paving composition with exceptional strength and fatigue resistance for use in the formation of roads and the like.

It is a particular object of the invention to provide a modified asphalt cement which is of suitable viscosity in bulk for paving and which cures to an asphalt cement of exceptional strength when mixed with aggregate and paved.

It is a further object of the invention to provide a modified asphalt cement suitable for mixing with aggregate to form a paving composition of superior Marshall stability.

It is a further object of the invention to provide a modified asphalt for use in the paving composition of the foregoing type which retains a large portion of its strength at elevated temperatures while forming a flexible pavement possessing self-healing properties.

It is another object of the invention to provide a method for modifying soft asphalt cement to form a pavement of upgraded physical properties.

Further objects and features of the invention will be apparent from the following description of its preferred embodiments.

DETAILED DESCRIPTION OF THE PREFERRED EMBODIMENTS

The present invention relates to a modified asphalt cement which may be combined with aggregate to form a paving composition with significantly improved physical properties. The asphalt cement is modified while it is in a heated fluid state by dissolving a strength-improving agent, manganese chloride ($MnCl_2$).

As used herein, the term "asphalt cement" refers to any of a variety of substantially unblown or unoxidized solid or semi-solid material at room temperature which gradually liquifies when heated. Its predominant constituents are bitumens, which are obtained as the residue of refining processing. Unless otherwise specified, the term excludes emulsions and cutbacks of the asphalt cement. Thus, it contains neither the water phase of the emulsion or the extraneous petroleum solvents or oils commonly added to asphalt cement to convert it to a cutback. The asphalt cement is generally characterized by a penetration of less than about 400 measured at 25° C. and a typical penetration between 40 and 300 (ASTM Standard Method D-5). The viscosity of asphalt cement at 60° C. is typically more than 65 poise.

It is important to dissolve the manganese chloride throughout the asphalt cement so that its strength improving effect is imparted to the final product in a consistent manner. For this purpose, the manganese chloride may be added to the asphalt cement in an anhydrous powder form or as crystals ($MnCl_2.4H_2O$). In the former instance, there is no water phase produced. On the other hand, in the latter instance, the water of crystallization is released and should be boiled off for optimum properties. Care is taken to avoid excessive foaming during such boiling. If desired, the $MnCl_2$ may be added in a predispersed or predissolved form in an inert diluent.

It has been found that the anhydrous form of $MnCl_2$ provides a superior modified asphalt cement in comparison to the crystalline form ($MnCl_2.4H_2O$). Thus, in the preferred method, the anhydrous powder is used as the source material.

The conditions of mixing the manganese chloride into the asphalt cement should be controlled to essentially dissolve the $MnCl_2$ into the asphalt cement for optimum properties. For this purpose, the asphalt cement should be at an elevated temperature and in a flowable fluid state. By way of example, a suitable temperature is one at which the asphalt cement is thinner than molasses at room temperature, typically thicker than water, and is flowable or pourable without stirring. Thus, a quantity of the asphalt should be sufficiently fluid to flow when placed on a solid surface. This is particularly advantageous as it is contemplated that the asphalt cement would be circulated under high speed agitation to provide a uniform dispersion. For example, in a batch reaction, a mechanical stirrer may be utilized with a reaction vessel. The asphalt cement is continuously circulated throughout the reaction vessel under the conditions of mechanical agitation provided by the stirrer.

To accomplish the foregoing dispersion, for a conventional asphalt cement (e.g., one designated AR-4000 by the Asphalt Institute with a typical ASTM penetration of about 60–70), a suitable mixing temperature is on the order of a minimum of about 100° C. for soft asphalt, and, preferably, on the order of 120° C. or more. At temperatures below this level, mixing times for total dispersion, even if feasible, become excessive for economy. On the other hand, the temperature of mixing should not be so high as to provide hardening due to other reactions which could weaken the asphalt cement. For this reason, it is preferred not to heat the asphalt cement to above about 225° C. Thus, suitable mixing temperatures are from about 100° C. to 225° C. with preferable mixing temperatures from 120° C. to 180° C., depending upon the type of asphalt and the mixing times and speeds. At temperatures on the order of 170° C., 20 to 30 minutes are sufficient under conventional mechanical stirring speeds as with an impeller type stirrer. On the other hand, mixing times as low as several minutes may be sufficient under certain circumstances.

It is preferable to perform the step of dispersing the $MnCl_2$ in the asphalt cement under an inert gas atmosphere such as nitrogen. This is because the presence of oxygen at such elevated temperatures can have detrimental effects upon the hardness of the final product.

It is difficult to determine whether or not all of the $MnCl_2$ is dissolved in the asphalt cement due to the large number and various types of constituents in the asphalt cement. Instead, an emperical standard is employed herein. Thus, the $MnCl_2$ is deemed to be dissolved when the modified asphalt cement provides exceptional increases in structural strength of the ultimate paving composition when mixed with aggregate, e.g., on the order of the improvements obtained in the data discussed hereinafter. Another test of dissolution is that if the $MnCl_2$ is mixed in solid form (either anhydrous or crystalline), when the modified asphalt cement is smeared on a slide and viewed at moderate magnification (e.g., 40 power), essentially no particles are observed.

Significant improvements in the $MnCl_2$-modified asphalt cement are obtained by adding a relatively small quantity of $MnCl_2$. Thus, at a concentration as low as 0.02 L weight % $MnCl_2$ based upon the asphalt cement, a paving composition is formed of improved compressive load strength. A suitable range of $MnCl_2$ is on the order of 0.02 to 2.0 weight % manganese chloride based on the asphalt cement. On the high side of the range and beyond, the incremental increases of properties are not as substantial as at lower levels. Also, if the concentration of $MnCl_2$ is increased substantially in excess of 0.5 weight %, some loss in flexibility of the ultimate product is found. Thus, a preferred range is on the order of 0.1 to 0.5 weight % $MnCl_2$ chloride while optimum physical properties are on the order of 0.3 weight %.

Dissolution of the $MnCl_2$ in the asphalt cement is preferably employed at a facility, such as the asphalt refinery, which is remote from the ultimate construction site as for roads or the like. This is possible because the asphalt cement containing $MnCl_2$ is not cured in bulk form and so can be stored until needed. In conventional processing, the modified asphalt cement is maintained in a fluid state from its time of formation, during normal storage and transport to a road site or the like, and during mixing with aggregate and until final paving. On the other hand, it may be desirable to add the $MnCl_2$ to the asphalt cement at the road construction site just prior to adding aggregate for some specific application. The $MnCl_2$-modified asphalt cement is characterized by a viscosity in a fluid state at the elevated temperature of road building comparable to conventional asphalt cement. However, as set forth below, the ultimately cured aggregate-containing paving composition has vastly superior strength in comparison to one formed with conventional asphalt cement.

The $MnCl_2$-modified asphalt cement in fluid form is premixed with preheated, predried aggregate to form a homogeneous mixture of uniformly coated aggregate in a paving composition, typically as performed in an asphalt mixing plant. The aggregate is preferably heated under conditions of time and temperature to drive off essentially all free moisture prior to mixing. During mixing, both the aggregate and asphalt are typically at a temperature of about 100° C. to 160° C. Before the composition has cooled to a temperature at which it loses its fluidity, it is spread on a road bed and compacted. Then, the asphalt is permitted to cure. After curing, the road comprises aggregate bound by a matrix of modified asphalt binder. This technique is known as "warm mixing".

It is noted that acceptable curing of the warm mix asphalt occurs at ambient temperatures, e.g., 22° C. Moderate elevations of temperature of curing (e.g., to 50° C.) accelerates the process. However, very high temperatures such as employed to blow asphalt, i. e., above 230° C. would be detrimental for the present process.

Subsequent to formation, the $MnCl_2$-modified asphalt cement may be modified by conventional techniques for maintaining it in a fluid form under road building conditions. For example, the modified asphalt may be formed into a cutback by fluxing the asphalt with a suitable volatile solvent or distillate. The modified asphalt cutback may then be directly mixed with aggregate and applied as a paving composition in fluid form, possibly at ambient temperatures. Another conventional technique for fluidizing the modified asphalt cement prior to mixing with aggregate and forming into a paving composition is to emulsify the asphalt by known techniques. An advantage of this mode of fluidizing is that after mixing with the aggregate it may be applied as a paving composition at room temperatures.

The aggregate of the present invention is suitably of the type conventionally employed in road building industry. Thus, it may range from fine particles such as sand to relatively coarse particles such as crushed stone, gravel or slag.

The ratio of aggregate to modified asphalt cement is that typical for road paving compositions. Thus, a minimum of about 85% by weight of aggregate and generally about 90 to 96% by weight of the total paving composition is employed in accordance with the present invention.

The modified asphalt of the present invention provides extraordinary increases in the flexural and compressive strength and fatigue resistance when mixed with aggregate and cured. Thus, in effect, it upgrades the type of aggregate which may be used to form a road with exceptional characteristics.

By modification in accordance with the invention, high strength roads may be formed from relatively soft asphalt cements (e.g., ones characterized by an ASTM penetration as high as 350–400 or less). Thus, the range of useful asphalt cement is expanded.

It is believed that the extraordinary increases in strength and fatigue resistance may be explained in accordance with the following theory. It is well known that asphalt cement contains a large number of compounds (e.g., tetraline or tetraline-type structures) that are readily autoxidized. Based upon experimentation, it is believed that the manganese ion of the manganese chloride causes the formation of a diketone of tetraline (1,4 diketo tetraline) which then forms stable, chemically resistant complexes with the metal. These complexes tie together asphalt molecules to cause vast increases in strength of the resulting asphalt cement-aggregate composition compared to ones formed in the absence of the $MnCl_2$.

As aforementioned, it has been found that the modified asphalt of the present invention does not harden or cure when in bulk form. At elevated temperatures above its melting point, it remains at a viscosity comparable to unmodified asphalt. Thus, the manganese chloride only functions to cause curing of the asphalt after mixing with aggregate. It is believed that this phenomenon may be explained by the requirement that the modified asphalt be in a relatively thin film, the state in which it exists in combination with aggregate. Thus, the asphalt tends to form a thin coating of 5–10 microns on the surface of the aggregate. Although the maximum thickness of the thin film is not known, it is believed that the film may be as thick as 150 microns or more. An explanation for the requirement of the asphalt to be in thin film form is that a certain amount of oxygen is required to penetrate throughout the film to permit the foregoing complexes to occur.

It has been found that increasing the void ratio of the modified asphalt-aggregate composition causes a corresponding increase in the curing rate. This is consistent with the theory that a certain amount of oxygen penetration of the asphalt is required to form the foregoing complexes.

Thus, at a 20% void ratio in a sand aggregate composition, significant curing can occur in a week. A typical road has a void ratio on the order of 5 to 10% which is sufficient for the benefits of the present invention.

As set out below, similar exceptional properties are imparted to the asphalt cement to those of copending application Ser. No. 963,293. A major improvement found in using $MnCl_2$ in comparison to manganese naphthenate, a preferred agent of the earlier application, is the significant reduction in cost of the modifying agent. Thus, comparable physical properties are imparted with $MnCl_2$ at a fraction of the cost of those imparted by manganese naphthenate. It is believed that both the $MnCl_2$ and manganese naphthenate function in accordance with the foregoing theory. In both instances, it is believed to be important that the manganese be thoroughly dispersed and dissolved throughout the asphalt to provide the desired increases in property. As set out below, a number of tests have been performed which show that the $MnCl_2$-modified asphalt cement provides a vastly improved paving composition compared to other inorganic modifying agents, some of which have been suggested in the prior art.

Asphalt cement modified with $MnCl_2$ is superior in providing physical properties in an aggregate-containing form, e.g., roadway, to a number of other additives, some of which are suggested by the prior art, as set out in the examples. In general, manganese in the chloride form is vastly superior to manganese in the sulfate or carbonate form. Also, anhydrous $MnCl_2$ is superior to anhydrous $CuCl_2$. This is particularly important as the former is substantially less expensive than the latter. Also, $MnCl_2$ is far superior to $CuSO_4$, $CoCl_2$, and $ZnCl_2$.

A further disclosure of the nature of the present invention is provided by the following specific examples of the practice of the invention. It should be understood that the data disclosed serve only as examples and are not intended to limit the scope of the invention.

EXAMPLE 1

Tests were performed with various compounds as additives to asphalt cement for use with aggregate in a paving composition. The bitumen asphalt cement was of the type designated AR-4000 by the Asphalt Institute. The modified asphalt cement was prepared by the addition of sufficient metal salt to produce 0.2% metal in 150 grams of asphalt cement. The metal salt was added while the asphalt cement was stirred under nitrogen at approximately 178° C. Stirring was continued at the same temperature for about 30 minutes. Then the modified asphalt cement was allowed to cool to room temperature.

The only exception to the above procedure was with respect to manganese sulfate. There, the time was increased to 45 minutes and the temperature to 200° C.

The aggregate was a poorly graded sand from Iraq which was heated for 1½ hours to 135° C. to 140° C. 13 grams of the aforementioned modified asphalt cement was also heated to the same temperature and added to 250 grams of sand. This was mixed and molded at that temperature into short Harvard miniature cores, 1.3" long × 1.3" in diameter. The cores were cooled and put into the oven held at 45° C. until tested. The results of the foregoing tests are set out in the following Table I.

TABLE I

| Treatment | Cure Time, Days | Unconfined Compressive Strength (kg/cm²) | |
|---|---|---|---|
| | | at 45° C. | at 22° C. |
| Untreated AR-4000 | 8 | 1.05 | 7.78 |
| Manganese Naphthenate | 8 | 14.70 | 24.89 |
| Manganese Chloride | 7 | 13.27 | 24.20 |
| | 14 | 16.64 | 28.23 |
| Manganese Sulfate | 8 | 2.37 | 13.64 |
| Manganese Carbonate | 6 | 0.96 | 9.39 |
| | 28 | 1.80 | 13.04 |
| Copper Sulfate | 13 | 2.06 | 10.59 |
| | 28 | 3.21 | 17.72 |
| Zinc Chloride | 7 | 1.04 | 11.47 |
| | 14 | 1.33 | 12.96 |

It is apparent from Table I that the strength of the samples modified by manganese chloride were vastly superior to those modified by manganese sulfate, manganese carbonate, copper sulfate or zinc chloride, particularly at the elevated temperature of 45° C. This is particularly important as strength without softening at high ambient temperatures is a major problem. Manganese chloride strengths are comparable to those of manganese naphthenate at the same temperature. However, manganese naphthenate is many times more expensive than manganese chloride.

EXAMPLE 2

A series of comparative tests were run similar to the foregoing ones. The metal salt modifiers were added to the asphalt cement under the same conditions at a ratio of 0.1% of metal per 150 grams of asphalt cement of the AR-4000 type. The same stirring conditions were maintained and the product was cooled at room temperature. The aggregate was a poorly graded decomposed granite sand. It was heated to 135° C. to 138° C. for at least 1.5 hours. 13 grams of asphalt cement preheated to the same temperature was added to 236.4 grams of the sand. Mixing and molding were performed at the same temperature and the cores were cured in an oven at 45° C. until tested. Testing was performed as set out in Example 1. The modifying agents were manganese chloride, copper chloride, and cobalt chloride, all in the anhydrous form. This form of the material was used, as it has been found that the anhydrous form provides superior properties. The results of the foregoing test are set out in the following Table II.

TABLE II

| Treatment | Unconfined Compressive Strength (kg/cm²) | |
|---|---|---|
| | at 45[C | at 22[C |
| 0.1% Mn as anhydrous MnCl₂ | 20.5 | 36.5 |
| 0.1% Cu as anhydrous CuCl₂ | 11.8 | 29.3 |
| 0.1% Co as anhydrous CoCl₂ | 3.31 | 20.2 |
| Untreated | 1.65 | 12.0 |

It is apparent that the strength imparted to the sample by manganese chloride is significantly superior to that of copper chloride. With respect to copper chloride, this is particularly important as the former material is far less expensive than the latter one.

What is claimed is:

1. A modified asphalt cement composition capable of improving the compressive strength characteristics of an aggregate-containing paving composition made therefrom comprising (a) a substantially unblown, unoxidized and unmodified asphalt cement having bitumens as a predominant constituent and being generally characterized by a penetration of less than about 400 measured at 25° C. and a viscosity greater than 65 poise at 60° C., and (b) between about 0.02 and 2.0 percent by weight of said unmodified asphalt cement of manganese chloride of copper chloride, alone or in combination, said manganese or copper chloride being uniformly dispersed or substantially dissolved in said asphalt cement.

2. The modified asphalt cement composition of claim 1 wherein the combined concentration of manganese chloride or copper chloride is between about 0.1 and 0.5 percent by weight of said unmodified asphalt cement.

3. The modified asphalt cement composition of claim 1 wherein said manganese or copper chlorides are present in anhydrous form.

4. A paving composition containing the modified asphalt cement composition of claim 1.

5. A paving composition having improved compressive strength characteristics comprising, a substantially unblown, unoxidized and unmodified asphalt cement having bitumens as its predominant constituent and being generally characterized by a penetration of less than about 400 measured at 25° C. and a viscosity greater than 65 poise at 60° C., an aggregate mixed with said asphalt, and between about 0.02 and 2.0 percent by weight of manganese chloride or copper chloride, based upon the weight of said asphalt component, uniformly dispersed or substantially dissolved in said asphalt component.

6. The paving composition of claim 5 in which at least 85 percent by weight of said total composition is aggregate.

7. A method of forming a paving composition comprising the steps of:

(a) heating a substantially unblown, unoxidized and unmodified asphalt cement having bitumens as its predominant component to a temperature sufficient to cause said asphalt cement to become flowable, (b) mixing said flowable asphalt cement with between about 0.02 and 2.0 percent by weight of manganese or copper chlorides for a time sufficient to permit said manganese or copper chlorides to become either uniformly dispersed or substantially dissolved in said flowable asphalt cement, and (c) adding at least 85 percent by weight of an aggregate, based upon the total weight of said paving composition, to said manganese or copper chloride containing asphalt cement.

8. The method of claim 7 wherein said unmodified asphalt cement is heated to a temperature between about 100° C. and 225° C. to make it flowable.

9. The method of claim 7 wherein said manganese or copper chloride-containing asphalt cement is allowed to cool to ambient temperatures, is stored, and thereafter is reheated to a flowable condition and mixed with said aggregate.

* * * * *